US008520005B2

(12) United States Patent
Koyatsu et al.

(10) Patent No.: US 8,520,005 B2
(45) Date of Patent: Aug. 27, 2013

(54) IMAGE PROCESSING SYSTEM, IMAGE FORMATION APPARATUS, COMPUTER READABLE MEDIUM AND COMPUTER DATA SIGNAL

(75) Inventors: Jun Koyatsu, Saitama (JP); Mitsuru Iioka, Saitama (JP); Noribumi Sato, Saitama (JP); Sato Okamoto, Tokyo (JP); Kaoru Koike, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1508 days.

(21) Appl. No.: 11/783,967

(22) Filed: Apr. 13, 2007

(65) Prior Publication Data

US 2008/0037891 A1 Feb. 14, 2008

(30) Foreign Application Priority Data

May 31, 2006 (JP) .................. 2006-150777

(51) Int. Cl.
*G06T 11/00* (2006.01)
*G09G 5/00* (2006.01)
*G06K 15/02* (2006.01)
*G06K 15/00* (2006.01)
*G06T 5/00* (2006.01)

(52) U.S. Cl.
USPC ............ 345/467; 345/611; 345/612; 358/2.1; 358/3.26; 358/3.27; 358/1.11

(58) Field of Classification Search
USPC ................. 345/467, 611, 612; 358/2.1, 3.26, 358/3.27
See application file for complete search history.

(56) References Cited

U.S. PATENT DOCUMENTS

| 4,841,375 A | * | 6/1989 | Nakajima et al. ............. 358/466 |
| 6,246,419 B1 | * | 6/2001 | Loce et al. ..................... 345/442 |
| 2003/0095135 A1 | * | 5/2003 | Kaasila et al. ................ 345/613 |
| 2005/0012949 A1 | * | 1/2005 | Kitahara et al. ............. 358/1.11 |

FOREIGN PATENT DOCUMENTS

| JP | 62-047660 A | 3/1987 |
| JP | 3242256 B2 | 9/1995 |
| JP | 11-234511 A | 8/1999 |
| JP | 2003-320706 A | 11/2003 |
| JP | 2004-259005 A | 9/2004 |
| JP | 2006-021484 A | 1/2006 |

OTHER PUBLICATIONS

Japanese Office Action, dated Jul. 26, 2011, issued in Application No. 2006-150777.

* cited by examiner

*Primary Examiner* — Daniel Washburn
*Assistant Examiner* — Jeffrey Chow
(74) *Attorney, Agent, or Firm* — Sughrue Mion, PLLC

(57) ABSTRACT

An image processing system includes a setting section and an image processing section. The setting section sets a process condition of electrophotographic image formation suited to reading of an information image that represents data by a pattern. The image processing section performs an image process for preventing degradation, in image quality, of an image other than the information image under the process condition set through the setting section.

20 Claims, 5 Drawing Sheets

IMAGE PROCESSING SYSTEM, IMAGE FORMATION APPARATUS, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-150777 filed May 31, 2006.

BACKGROUND

1. Technical Field

The invention relates to an image processing system, an image formation apparatus, a computer readable medium and a computer data signal.

2. Related Art

After a bar code is printed, the printed bar code will be read by a bar code reader. Therefore, it should be printed as it is suited to the reading operation. On the other hand, a bar code is often printed on a general document. In this case, text, a pattern, a photo, and the Like as well as the bar code are printed. If the printing process is only suited to bar codes, it is concerned that the printing quality of the text, etc., other than the bar code may be degraded.

SUMMARY

According to an aspect of the invention, an image processing system includes a setting section and an image processing section. The setting section sets a process condition of electrophotographic image formation suited to reading of an information image that represents data by a pattern. The image processing section performs an image process for preventing degradation, in image quality, of an image other than the information image under the process condition set through the setting section.

BRIEF DESCRIPTION OF THE DRAWINGS

Exemplary embodiments of the invention will be described below in detail with reference to the accompanying drawings, wherein.

DETAILED DESCRIPTION

Referring now to the accompanying drawings, exemplary embodiments of the invention will be described.

Figure 1:
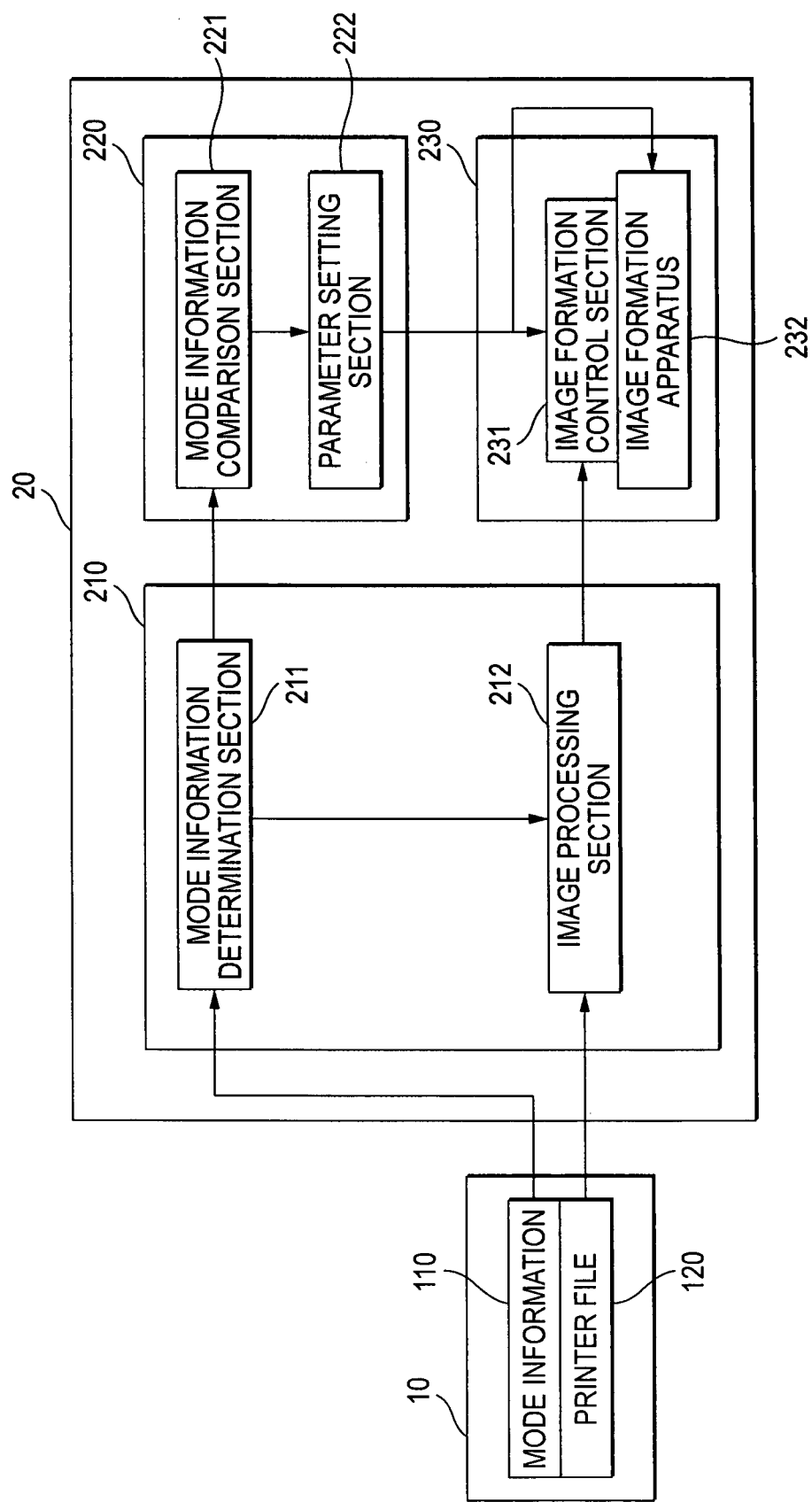
FIG. 1 is a block diagram to show a general configuration example of a print process system.

The accompanying drawings show the exemplary embodiments of the invention. FIG. 1 is a block diagram to show the conceptual module configuration of the whole of a print process system.

Each section in the description may represent a generally logically detachable component of software, hardware, etc. Therefore, the sections in the exemplary embodiment mean not only components in the hardware configuration, but also modules in a program. Thus, the exemplary embodiments also serve as description of a system, a program, and a method. The sections are almost in a one-to-one correspondence with functions. However, in implementation, one module may be one program, or two or more modules may make up one program, or two or more programs may make up one module. Two or more modules may be executed by one computer or one module may be executed in two or more computers in a distributed or parallel environment. In the following description, the term "connection" contains not only physical connection, but also logical connection.

The system is not only provided by connecting plural apparatus, hardware, computers, etc., through a network, etc., but also implemented as one apparatus.

In the following description, an electrophotographic printer is mainly illustrated as an image formation apparatus, and a bar code is mainly illustrated as an information image that represents data (digits, text, symbols and code) as a pattern.

The whole print process system includes a personal computer 10 and a printer 20. The personal computer 10 and the printer 20 are connected by a serial interface such as a USB (Universal Serial Bus) or a network.

In the personal computer 10, for example, an operator creates a document and inputs a command for printing the document with the printer 20. Here, it is assumed that the document contains not only a bar code, but also text, a pattern, and/or a photo. When the document print command is input, a printer driver in the personal computer 10 generates a printer file 120 from document data. Specifically, the printer file 120 is described in PostScript. Mode information 110 is added to the printer file 120. The mode information 110 is data indicating whether or not the printer file 120 contains a bar code. That is, the mode information 110 is a processing code that specifies improvement in readability of a bar code in printing the printer file 120. When the printer driver converts the document into the printer file 120, the printer driver may detect a bar code and add the mode information 110 to the printer file 120, or if a user of the personal computer 10 wants to explicitly print a bar code clearly with the printer 20, the mode information 110 may be added to the printer file 120 through a user interface of the personal computer 10. The mode information 110 may be described in a header of the printer file 120. The mode information 110 may be added to each page of the printer file 120.

When the operator inputs a print command, the personal computer 10 sends to the printer 20 the printer file 120 to which the mode information 110 is added.

The printer 20 includes three major sections, that is, a main control section 210, a printer control section 220, and an image output section 230.

The main control section 210 controls the whole printer 20, serves as an interface with the personal computer 10, and controls the printer control section 220 and the image output section 230.

The main control section 210 contains a mode information determination section 211 and an image processing section 212. The mode information determination section 211 receives the mode information 110 from the personal computer 10 and the image processing section 212 receives the printer file 120 from the personal computer 10.

The mode information determination section 211 determines as to whether or not the printer file 120 contains a bar code, based on the mode information 110. If the mode information determination section 211 determines that the printer file 120 contains a bar code, the mode information determination section 211 instructs the printer control section 220 to set an electrophotographic process condition so as to improve readability of a bar code. The mode information determination section 211 instructs the image processing section 212 to perform an image process for preventing degradation of the image quality, for image areas other than the bar code if the process condition for improving the readability of a bar code is set.

On the other hand, the image processing section 212 receives the printer file 120 from the personal computer 10, converts the printer file 120 into image data that can be printed by the image output section 230 (decomposition process), and performs image processes such as color conversion, UCR (under color removal) and gamma correction. The image data subjected to the image process is sent to the image output section 230 as a video signal. If the image processing section 212 is instructed by the mode information determination section 211 to perform the image process for preventing degradation of the image quality for image areas other than the bar code, the image processing section 212 performs the predetermined image process as swell as a usual image process. The predetermined image process is a process of thickening a line that is thinner than the minimum black line width of the bar code, a process of thickening the line width of a character that is in a predetermined font (for example, Ming-style) and that is smaller than predetermined points, and a process of correcting gradation for example. The predetermined image process may be a combination of those processes. The reason why these processes are performed is as follows. Since the process condition is changed so as to thinly represent a thin line to improve the readability of a bar code, the thin line and character to be essentially reproduced as usual are also made thin. Furthermore, the tone is also broken. Thus, it is concerned that the image quality other than the bar code may be degraded.

The printer control section 220 is connected to the main control section 210 and the image output section 230, and sets a parameter in the image output section 230 in accordance with an instruction from the main control section 210.

The printer control section 220 includes a mode information comparison section 221 and a parameter setting section 222. Upon reception of an instruction of setting a process condition from the mode information determination section 211 of the main control section 210, the mode information comparison section 221 detects a current process condition. If the current process condition is one for improving the readability of a bar code, it is not necessary to change the process condition. Therefore, the mode information comparison section 221 does not issue an instruction of setting a process parameter to the parameter setting section 222. If the current process condition is a usual process condition (which is not one for improving the readability of a bar code), to change the current process condition to the process condition for improving the readability of a bar code, the mode information comparison section 221 issues an instruction of setting a parameter to the parameter setting section 222 so as to set the process condition. If a target image is a color image and the bar code color is a single color (usually black), the process condition may be set for an image only consisting of the bar code color. In an image formation apparatus 232, the process conditions may be set separately for respective four colors, that is, C (cyan), M (magenta), Y (yellow), and K (black).

Upon reception of the instruction of setting the parameter from the mode information comparison section 221, the parameter setting section 222 sets a parameter to the image output section 230.

To enhance the readability of a bar code, for example, it may be necessary to draw each line forming the bar code in optimum thickness. Particularly, the readability depends on contrast between adjacent black and white lines. Thus, the readability of a bar code may be enhanced by drawing thin lines sharply (for example, thinly and darkly). The process condition may be laser light amount, charge bias, developing bias, or developing bias ratio (=(developing bias—latent image potential)/(charge potential—latent image potential) or may be a combination of those.

The image output section 230 is connected to the main control section 210 and the printer control section 220 and prints in accordance with image data supplied from the main control section 210 and the parameters set by the printer control section 220.

The image output section 230 includes an image formation control section 231 and the image formation apparatus 232. The image formation control section 231 receives the image data subjected to the image process performed by the image processing section 212 and controls the image formation apparatus 232 so as to print the image data in accordance with the parameter set by the parameter setting section 222.

The image formation apparatus 232 prints the image data in accordance with the parameter set by the parameter setting section 222 under the control of the image formation control section 231. The hardware configuration of the image formation apparatus 232 is described later with reference to FIG. 3.

A hardware configuration of the whole print process system will be described with FIG. 2. The personal computer 10 and the printer 20 are connected by a USB or a network 99. The printer 20 includes the main control section 210, the printer control section 220 and the image output section 230.

The main control section 210 has a CPU 2101, ROM 2102, RAM 2103, an HDD 2104, a network interface 2105, a control interface 2106, an image output section interface 2107, and a bus 2108.

The CPU 2101 (Central Processing Unit) is a control section for executing a process in accordance with a computer program describing the execution sequence of the mode information determination section 211 and the image processing section 212 which are described above in the exemplary embodiment.

The ROM 2102 (Read-Only Memory) stores programs, computation parameters, etc., used by the CPU 2101. The RAM 2103 (Random Access Memory) stores programs used in execution of the CPU 2101 and parameters that are changed as appropriate with the execution. The HDD 2104 (Hard Disk Drive) contains a hard disk and drives the hard disk for recording or reproduces programs and information executed by the CPU 2101. Input image data, etc., is stored on the hard disk. Further, various computer programs including various data processing programs, etc., are stored on the hard disk.

The network interface 2105 is connected to the USB or the network 99 for executing a data communication process with an external system. The control interface 2106 is an interface with the printer control section 220 for transmitting the determination result of the mode information determination section 211 to the printer control section 220. The image output section interface 2107 is an interface with the image output section 230 for transmitting video data of the image processing section 212 to the image output section 230.

The components are interconnected by the bus 2108.

The printer control section 220 has a CPU 2201, ROM 2202, RAM 2203, a main control section interface 2206, an image output section interface 2207, and a bus 2208.

The CPU 2201 is a control section for executing a process in accordance with a computer program describing the execution sequence of the mode information comparison section 221 and the parameter setting section 222 described above in the exemplary embodiment. The ROM 2202 has almost the same configuration as that of the ROM 2102 in the main control section 210. The RAM 2203 has almost the same configuration as that of the RAM 2103 in the main control section 210. The main control section interface 2206 has almost the same configuration as that of the main control section interface 2106 in the main control section 210. The image output section interface 2207 has almost the same configuration as that of the image output section interface 2107 in the main control section 210.

Figure 3:
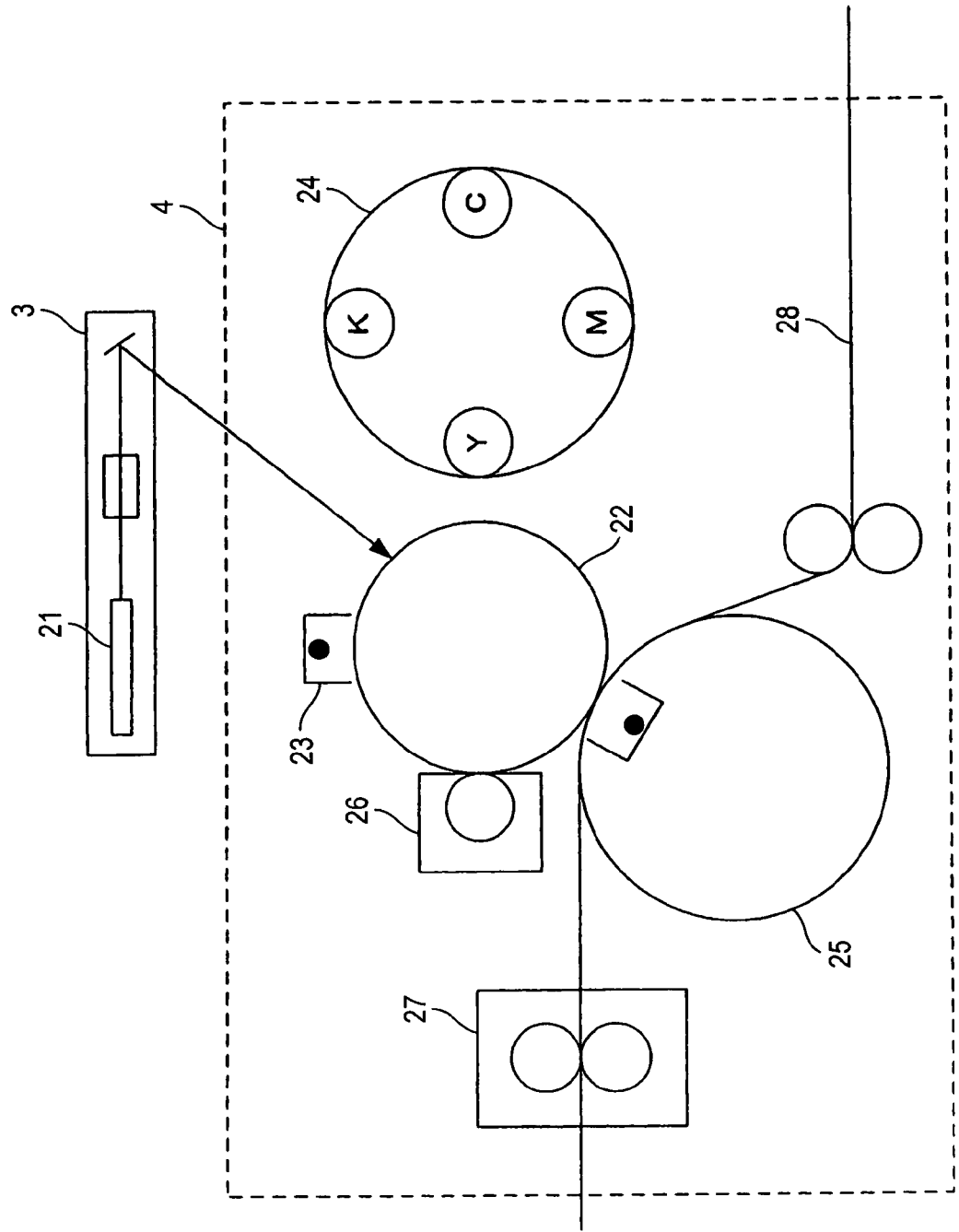
FIG. 3 is a drawing to describe a hardware configuration example of an image formation section.

The image output section 230 will be described with reference to FIG. 3.

Figure 2:
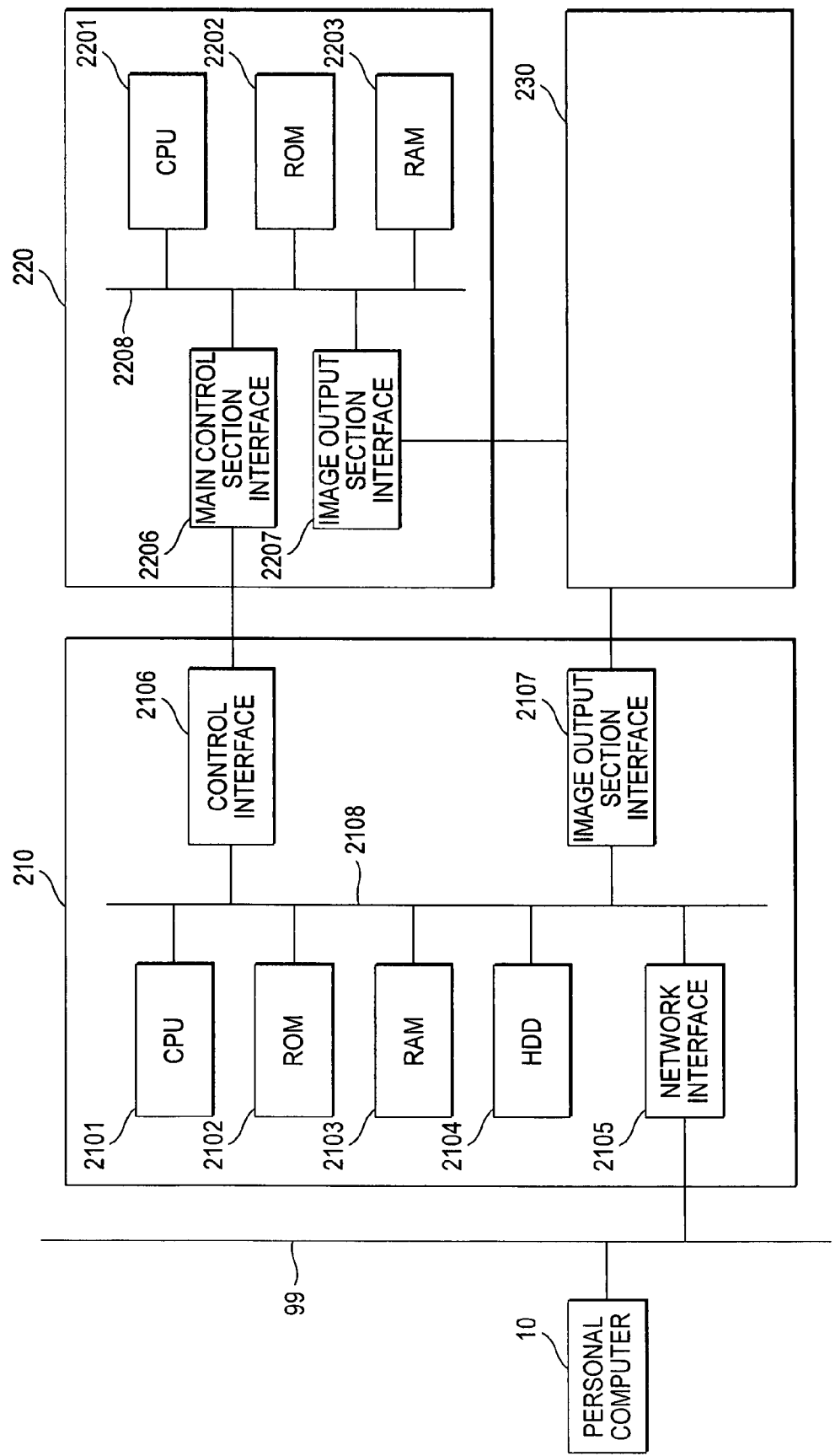
FIG. 2 is a block diagram to show a hardware configuration example of the whole print process system.

The hardware configuration shown in FIG. 2 shows one configuration example. The exemplary embodiment is not limited to the configuration in FIG. 2. Any configuration may be adopted if it makes it possible to implement the functions described in the exemplary embodiment. For example, some functions may be implemented as dedicated hardware and some functions may be included in an external system and may be connected via a communication line and further a plurality of systems shown in FIG. 3 may be connected via a communication line so as to operate in cooperation with each other.

A hardware configuration example of the image formation apparatus 232 will be described with FIG. 3. The image formation apparatus 232 has an image exposure section 3 and an image formation section 4.

The image exposure section 3 forms an electrostatic latent image on an image support 22 in response to the image data processed by the image processing section 212. The image exposure section 3 has a semiconductor laser, for example, as an exposure light source 21 and also has an optical system of a mirror for guiding laser light emitted from the semiconductor laser to the image support 22, a polygon mirror for scanning laser light over the image support 22, and the like. For example, light control of the exposure light source 21 is performed according to a signal pulse converted from the image data, whereby the electrostatic latent image responsive to the image data can be formed on the image support 22.

The image formation section 4 forms the electrostatic latent image formed on the image support 22 in the image exposure section 3 on a recording medium 28 as an image. The image support 22 is surrounded by a charger 23, a developing device 24, a transfer device 25, a cleaner 26, etc. The charger 23 charges the surface of the image support 22 as predetermined charges. After the charger 23 charges the image support 22, the image exposure section 3 forms the electrostatic latent image on the image support 22. The developing device 24 causes toner, for example, as a developer to be absorbed on the image support 22 by the charges on the image support 22. Accordingly, a developer image (toner image) is formed on the image support 22. In the example, four different color developers (CMYK) are included. The transfer device 25 transfers the developer absorbed on the image support 22 to the recording medium 28. The recording medium 28 is attracted onto a transfer drum of the transfer device 25 and a plurality of developers are transferred to the recording medium 28 in order. The cleaner 26 removes the developer not transferred by the transfer device 25 from the image support 22. The image formation section 4 further includes a fuser 27. After a plurality of developer images are transferred to the recording medium 28, the recording medium 28 is stripped off from the transfer device 25 and the developers transferred to the recording medium 28 are fixed on the recording medium 28 by the fuser 27.

The configuration of the image formation section 4 is shown by way of example and any other configuration may be adopted. For example, an intermediate transfer body may be included between the image support 22 and the recording medium 28. To form a color image, as many image exposure sections 3 and image formation sections 4 as the number of developers may be arranged or further an intermediate transfer body may be used.

Figure 4:
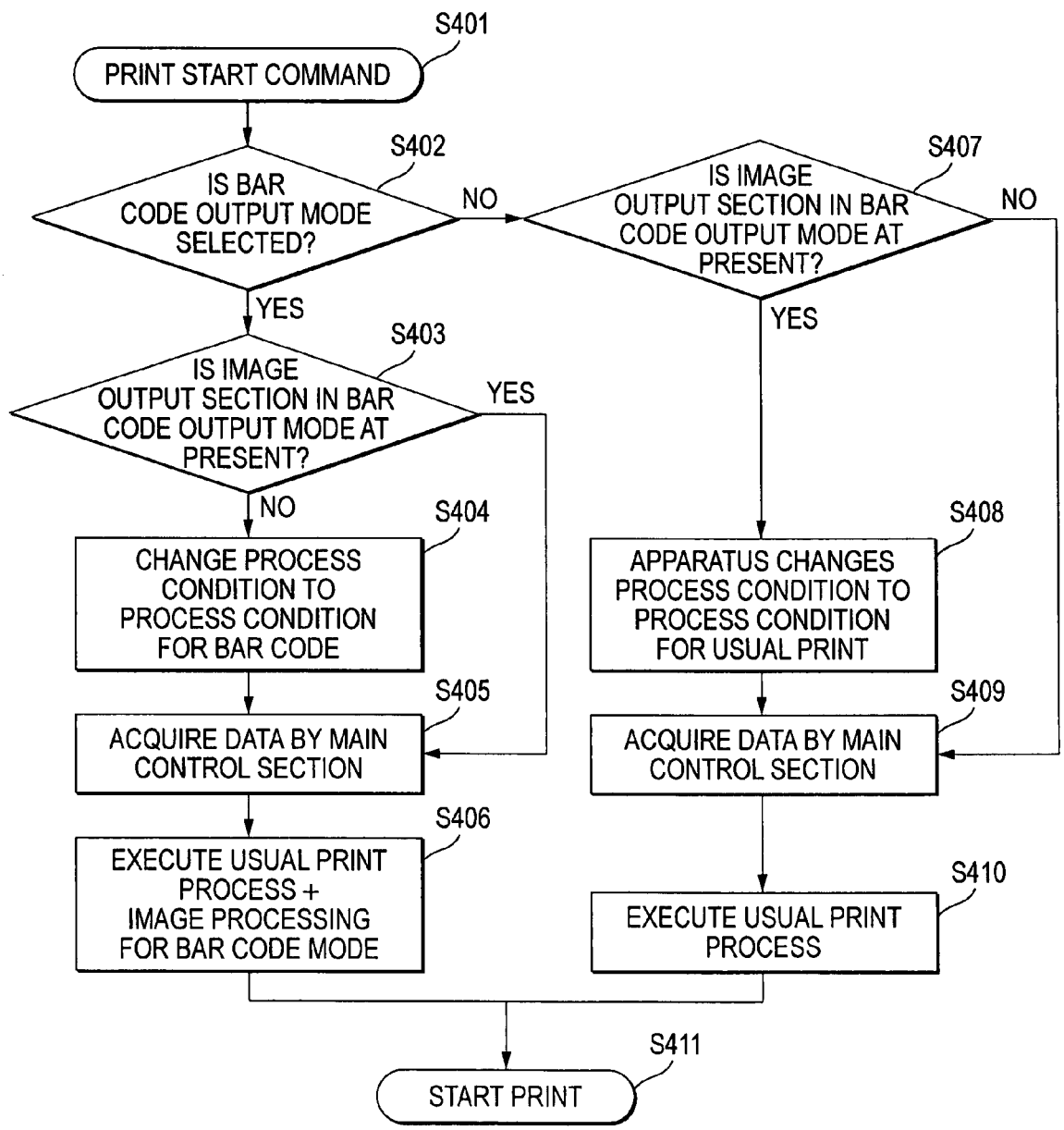
FIG. 4 is a flowchart to describe a print process performed by the whole print process system.

A print process performed by the whole print process system will be described with FIG. 4.

At step S401, the operator inputs a print start command through the personal computer 10. Upon reception of the command, the mode information determination section 211 and the image processing section 212 in the printer 20 execute processes. To send data to the printer 20, the operator may select a bar code mode so as to print an image containing a bar code, from a user interface of the printer driver. When the bar code mode is selected, the printer driver sends mode information 110 together with a printer file 120 to the printer 20. The printer driver can recognize that the bar code mode is selected, by detecting presence of a bar code.

At step S402, upon reception of the command at step S401, it is determined as to whether or not the mode information 110 indicates print suited to readability of the bar code (bar code output mode).

Usual printing is executed at steps S407 to S410.

At step S407 (NO at step S402), the mode information comparison section 221 detects the current parameter state of the image output section 230 and determines as to whether or not the bar code output mode is indicated. If the bar code output mode is not indicated (usual print process condition), the process goes to step S409.

At step S408 (YES at step S407), the mode information comparison section 221 changes the parameter of the process condition of the image output section 230 to a usual print parameter. The post-changed process condition is fixed until the next change is made.

At step S409, the image processing section 212 of the main control section 210 acquires the printer file 120.

At step S410, the image processing section 212 performs only the usual print process. That is, the image process suited to readability of the bar code is not performed.

Printing suited to readability of the bar code is executed at steps S403 to S406.

At step S403 (YES at step S402), the mode information comparison section 221 detects the current parameter state of the image output section 230, and determines as to whether or not the bar code output mode is indicated. If the bar code output mode is indicated, the process goes to step S405.

At step S404 (NO at step S403), the mode information comparison section 221 changes the parameter of the process condition of the image output section 230 so as to enhance readability of the bar code. The condition of sharpening a thin line more than usual is, for example, to raise the charging bias more than usual, to lower the developing bias more than usual, to lower the laser light amount more than usual, to lower the developing bias ratio (=(developing bias−latent image potential)/(charge potential−latent image potential) more than usual, to further lower the developing bias more than usual although the charging bias is lowered more than usual, to lower the developing bias more than usual and lower the laser light amount more than usual, to raise the charging bias more than usual and lower the laser light amount more than usual, or the like.

From the viewpoint of the image quality, the setup value of each parameter after the process condition is changed may be found by performing predetermined computation for the usual setup value (before the bar code output mode is entered) which should be optimized for the environment and the life of each consumable. For example, the optimized setup value is multiplied by a predetermined value or a predetermined value is added to or is subtracted from the optimized setup value. However, the value may be set to a fixed value regardless of the environment or aging.

The post-changed process condition is fixed until the next change is made.

At step S405, the image processing section 212 of the main control section 210 acquires the printer file 120.

At step S406, the image processing section 212 performs the usual print process and the image process suited to readability of the bar code. The image process suited to readability of the bar code may include a process of thickening the line width of a character that is in the predetermined font (for example, Ming-style) and that is smaller than the predetermined points, a process of thickening a thinner line than the minimum black line width of the bar code, and/or a process of correcting tone.

The reason why such a process is performed is as follows. Since the process condition is changed so as to thinly represent a thin line in the bar code output mode, thin lines and thin characters that are to be reproduced as usual are also made thin. Furthermore, the tone is also broken. Thus, it is concerned that the image quality of portions other than the bar code may be degraded.

Figure 6A:
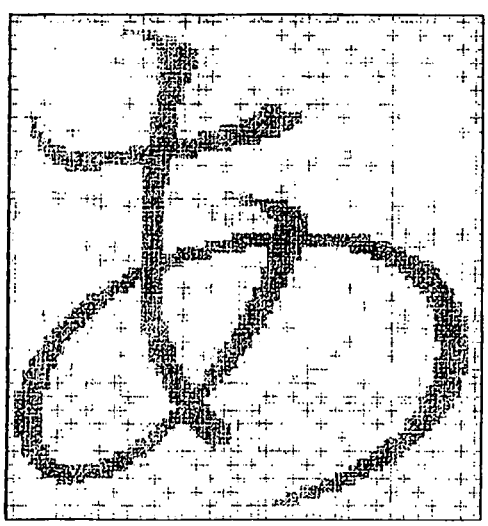
FIG. 6 is a drawing to describe an example of correcting a line thickness of a character.
Figure 6A:
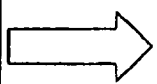
Figure 6B:
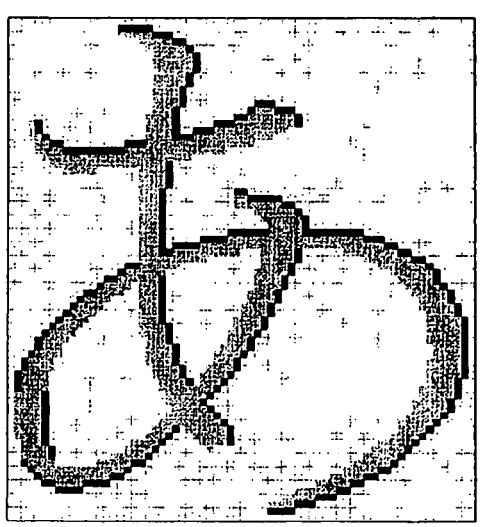

For example, a small character in Ming-style may contain a line drawn in pixels of several dots. If such a character exists, when it is printed with a parameter of a process condition of enhancing readability of the bar code, there is a possibility that the line may also become thin and the character balance may become poor. Then, the process of thickening the line width is performed for such a character. An example of correcting the line thickness of a character will be described with reference to FIG. 6. FIG. 6A shows the original image of one Japanese-language character. It is assumed that this character is in Ming-style and has points smaller than a predetermined value. To decompose, the image processing section 212 detects that the image is a character and that the character is in Ming-style and has points less than the predetermined value. The image processing section 212 performs the process of correcting the line thickness of the character, that is, the process of thickening the line for the character image. The process of thickening the line is a process of ORing the original image of the character and an image provided by shifting the original image one dot up or down or left or right, for example. As a process result, the Japanese-language character in question is thickened as a whole as shown in FIG. 6B. In FIG. 6B, the pixels represented in dark black are pixels thickened by performing this process.

Likewise, a thinner line than the minimum black line width of a bar code, particularly a thin line represented in one dot or so if the resolution is 600 dots per inch is printed with a parameter of a process condition of enhancing readability of the bar code, there is a possibility that such a thin line may disappear. Then, as the process of thickening a line that is thinner than the minimum black line width of a bar code, the image processing section 212 also detects a line that is thinner than the minimum black line width of a bar code and performs the process of thickening the line width for such a thin line as with the character.

Figure 5A:
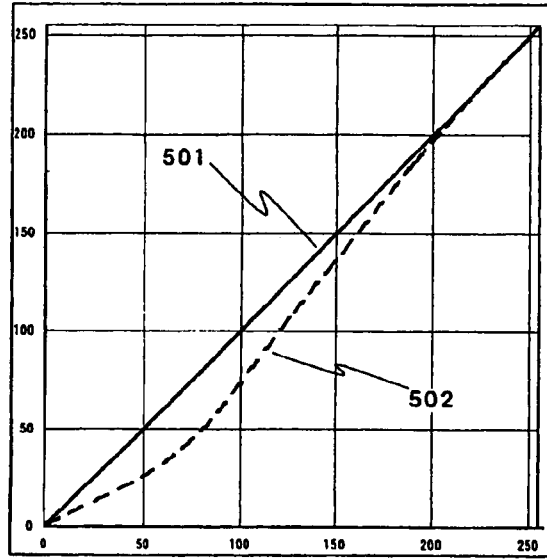
FIG. 5 is a drawing to describe a correction example of tone.
Figure 5B:
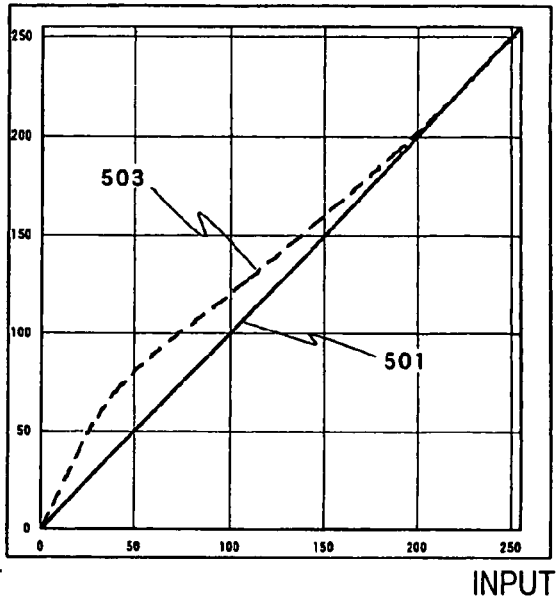

A process example of correcting tone will be described with reference to FIG. 5. The horizontal axis in FIG. 5 shows the tone of an input image, and its vertical axis shows the tone of an output image. That is, ideally the tone of the input image is reflected in the output image as it is (straight line of an ideal gamma characteristic 501 in FIG. 5A). However, if a parameter for thinning reproducibility of a thin line is used, the tone characteristic becomes a curve that is located below the straight line of the ideal gamma characteristic 501 occurs like a gamma characteristic 502 after the process condition is changed in FIG. 5A. Then, gamma correction is executed so as to produce a curve located above the straight line of the ideal gamma characteristic 501 like a gamma correction curve 503 in FIG. 5B. More specifically, a table for representing the gamma correction curve 503 in FIG. 5B (TRC: Tone Reproduction Curve) is provided and is referred to. Thereby, conversion can be executed. Accordingly, it is made possible to maintain tone.

At step S411, the image formation apparatus 232 outputs the image data generated at step S410 or S406 in accordance with the parameter changed at step S408 or S404.

In the exemplary embodiment, the electrophotographic printer is shown as the image formation apparatus, but the invention can also be applied to an electrophotographic copier, fax, multifunction processing machine (also called multifunction copier, having the functions of a scanner, a printer, a copier, a fax, etc.,), etc.

In the exemplary embodiment, a bar code is shown as an information image, but the invention can also be applied to a two-dimensional bar code such as QR code, glyph code (for example, disclosed in JP Hei. 6-75795 A), and an information image of an electronic watermark, etc.

In the description of the exemplary embodiment, the image processing section 212 performs image processing to prevent image quality degradation of other images than an information image, but the image processing may be image processing of enhancing the image quality more than the usual print image quality, of course; it need not be limited to the above-described image processing and different image processing may be adopted.

The described program can also be stored on a recording medium. For example, a computer readable medium stores a program causing a computer to execute a process. The process may include: setting a process condition of electrophotographic image formation suited to reading of an information image that represents data by a pattern; and performing an image process for preventing degradation, in image quality, of an image other than the information image under the set process condition.

A computer readable medium stores a program causing a computer to execute a process. The process includes: accepting image data for electrophotographic image formation and a process code that specifies whether or not a process concerning an information image that represents data by a pattern is to be performed; setting a process condition of the electrophotographic image formation suited to reading of the information image if the process code accepted by the acceptance section specifies execution of the process concerning the information image; and performing an image process for the accepted image data if the accepted process code specifies the execution of the process concerning the information image.

The expression "computer readable recording medium" is used to mean a recording medium that can be read by a computer, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM), etc., for example.

The described program or a part thereof can be recorded in any of the described record media for retention, distribution, etc. The described program or a part thereof can also be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and can also be carried over a carrier wave.

Further, the described program may be a part of another program or may be recorded in a recording medium together with a different program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a control section using at least one central processing unit (CPU) for functioning as:
a setting section that sets a process condition of electrophotographic image formation suited to reading of an information image that represents data by a coded pattern, wherein an image includes the information image; and
an image processing section that performs an image process for preventing degradation, in image quality, of the image other than the information image under the process condition set through the setting section, wherein
the image process performed by the image processing section includes a process of thickening a line whose width is smaller than a minimum width of a solid line contained in the information image.

2. The system according to claim 1, wherein the process condition set through the setting section includes a condition of sharpening lines contained in the information image.

3. The system according to claim 1, wherein the process condition set through the setting section includes at least one of a laser light amount, a charging bias, a developing bias and a developing bias ratio in the electrophotographic image formation.

4. The system according to claim 1, wherein the image process performed by the image processing section further includes at least one of a process of thickening a thickness of a character which is smaller in size than a predetermined point, and a process of correcting a tone.

5. The system according to claim 1, wherein:
a target image is a multicolor image, and
the process condition set through the setting section is applied to images having a color of the information image.

6. An image formation apparatus comprising:
the image processing system according to claim 1; and
an image formation section that performs electrophotographic image formation of the image processed by the image processing section of the image processing system, according to the process condition set through the setting section of the image processing system.

7. The image processing system according to claim 1, wherein the coded pattern comprises a bar code, a two-dimensional bar code, a three-dimensional bar code, a glyph code, or an electronic watermark.

8. An image processing system comprising:
a control section using at least one central processing unit (CPU) for functioning as:
an acceptance section that accepts image data for electrophotographic image formation and a process code that specifies whether or not a process concerning an information image that represents data by a coded pattern is to be performed, wherein an image includes the information image;
a setting section that sets a process condition of the electrophotographic image formation suited to reading of the information image if the process code accepted by the acceptance section specifies execution of the process concerning the information image; and
an image processing section that performs an image process for the image data accepted by the acceptance section if the process code accepted by the acceptance section specifies the execution of the process concerning the information image, wherein
the image processing section performs an image process to prevent degradation, in image quality, of the image other than the information image under the process condition set through the setting section, for the image data accepted by the acceptance section, and
the image process performed by the image processing section includes a process of thickening a line whose width is smaller than a minimum width of a solid line contained in the information image.

9. The image processing system according to claim 8, wherein if a currently setup process condition is different from the process condition of the electrophotographic image formation suited to the reading of the information image, the setting section sets the process condition of the electrophotographic image formation suited to the reading of the information image.

10. The system according to claim 8, wherein the process condition set through the setting section includes a condition of sharpening lines contained in the information image.

11. The system according to claim 8, wherein the process condition set through the setting section includes a condition of at least one of a laser light amount, a charging bias, a developing bias and a developing bias ratio in the electrophotographic image formation.

12. The system according to claim 8, wherein the image process performed by the image processing section further includes at least one of a process of thickening a thickness of a character which is smaller in size than a predetermined point, and a process of correcting a tone.

13. The system according to claim 8, wherein the process code accepted by the acceptance section is specified by an operator.

14. The system according to claim 8, wherein:
a target image is a multicolor image, and
the process condition set through the setting section is applied to images having a color of the information image.

15. An image formation apparatus comprising:
the image processing system according to claim 8; and
an image formation section that performs electrophotographic image formation of an image processed by the image processing section of the image processing system, according to the process condition set through the setting section of the image processing system.

16. The image processing system according to claim 8, wherein the coded pattern comprises a bar code, a two-dimensional bar code, a three-dimensional bar code, a glyph code, or an electronic watermark.

17. A non-transitory computer readable medium storing a program causing a computer to execute a process comprising:
setting a process condition of electrophotographic image formation suited to reading of an information image that represents data by a coded pattern, wherein an image includes the information image; and
performing an image process for preventing degradation, in image quality, of an the image other than the information image under the set process condition, wherein the image process performed by the image processing section includes a process of thickening a line whose width is smaller than a minimum width of a solid line contained in the information image.

18. The non-transitory computer readable medium according to claim 17, wherein the coded pattern comprises a bar code, a two-dimensional bar code, a glyph code, or an electronic watermark.

19. A non-transitory computer readable medium storing a program causing a computer to execute a process comprising:
accepting image data for electrophotographic image formation and a process code that specifies whether or not a process concerning an information image that represents data by a coded pattern is to be performed, wherein an image includes the information image;
setting a process condition of the electrophotographic image formation suited to reading of the information image if the process code accepted by the acceptance section specifies execution of the process concerning the information image; and
performing an image process for the accepted image data if the accepted process code specifies the execution of the process concerning the information image, wherein
the image processing section performs an image process to prevent degradation, in image quality, of the image other than the information image under the process condition set through the setting section, for the image data accepted by the acceptance section, and
the image process performed by the image processing section includes a process of thickening a line whose width is smaller than a minimum width of a solid line contained in the information image.

20. The non-transitory computer readable medium according to claim 19, wherein coded pattern comprises a bar code, a two-dimensional bar code, a glyph code, or an electronic watermark.

* * * * *